United States Patent [19]

Minagawa et al.

[11] 4,101,508
[45] Jul. 18, 1978

[54] 2,2,6,6-TETRAMETHYL-4-PIPERIDYL BICYCLIC HEPTANE AND OCTANE CARBOXYLIC ACID ESTERS AS STABILIZERS FOR SYNTHETIC POLYMERS

[75] Inventors: Motonobu Minagawa, Kosigaya; Naohiro Kubota; Toshihiro Shibata, both of Urawa, all of Japan

[73] Assignee: Argus Chemical Corporation, Brooklyn, N.Y.

[21] Appl. No.: 735,561

[22] Filed: Oct. 26, 1976

[51] Int. Cl.² .............. C08K 5/34; C07D 211/46; C07D 211/94
[52] U.S. Cl. .............. 260/45.8 N; 260/45.8 NT; 260/293.56; 260/293.63; 260/293.88; 260/880 R
[58] Field of Search .............. 260/45.8 N, 293.56, 260/293.63, 293.88

[56] References Cited

U.S. PATENT DOCUMENTS

| | | | |
|---|---|---|---|
| 2,746,964 | 5/1956 | Biel | 260/293.63 |
| 3,640,928 | 2/1972 | Murayama et al. | 260/45.8 N |
| 3,840,494 | 10/1974 | Murayama et al. | 260/293.88 |
| 3,954,779 | 5/1976 | Smith et al. | 260/45.8 N |
| 3,959,291 | 5/1976 | Cook | 260/45.8 N |
| 3,976,658 | 8/1976 | Avar et al. | 260/310 R |
| 3,991,012 | 11/1976 | Ramey et al. | 260/45.75 N |

FOREIGN PATENT DOCUMENTS 251,666   8/1926   United Kingdom ............ 260/293.88

Primary Examiner—Melvyn I. Marquis
Assistant Examiner—R. A. White

[57] ABSTRACT

2,2,6,6-tetramethyl-4-piperidyl esters of bicyclic heptane and octane carboxylic acids are provided, useful as stabilizers for organic polymeric materials, and having the general formula:

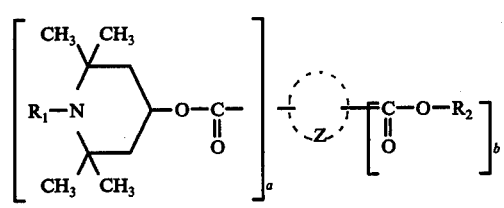

$R_1$ is selected from the group consisting of hydrogen and O;
$R_2$ is selected from the group consisting of alkyl; alkenyl; cycloalkyl; aryl; alkaryl; aralkyl;
$a$ is selected from the group consisting of 1, 2, 3 and 4;
$b$ is selected from the group consisting of 0, 1, 2 and 3; and $a + b$ is 1, 2, 3 or 4; and
"Z" is a bicyclic heptane or octane ring having from seven to eight ring carbon atoms.

26 Claims, No Drawings

2,2,6,6-TETRAMETHYL-4-PIPERIDYL BICYCLIC HEPTANE AND OCTANE CARBOXYLIC ACID ESTERS AS STABILIZERS FOR SYNTHETIC POLYMERS

Hindered 2,2,6,6-tetraalkyl-4-carboxylic acid ester piperidine compounds have been proposed by Murayama et al U.S. Pat. No. 3,640,928 patented Feb. 8, 1972 as light and heat stabilizers for synthetic polymers, such as polyolefins, polyvinyl chloride, polyvinylidene chloride, polyurethanes, and polyamides. These compounds have the general formula:

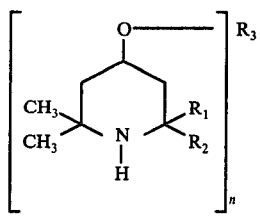

or a salt thereof.

In the above Formula:

$R_1$ and $R_2$ which may be the same or different, each are an alkyl group such as methyl, ethyl, isopropyl or dodecyl, or they form, together with the carbon atom to which they are attached, a saturated alicyclic group such as:

or a group of the formula

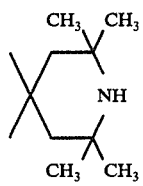

$n$ is an integer of 1 to 3 inclusive: and $R_3$ is an acyl group.

These compounds have proved to be particularly acceptable because they do not impart a discoloration of their own to the synthetic polymer. The compounds generally employed previously have either been highly colored, such as the nickel compounds (which are normally green) and the 2-hydroxybenzophenones (which are varying shades and intensities of yellow). They also show very little tendency towards sublimation and exudation, and they have an excellent stabilizing action against both heat and light deterioration.

Consequently, the Murayama et al patent has been followed by a large number of patent and literature disclosures by Murayama et al and others of compounds including a 2,2,6,6-tetrasubstituted-4-piperidyl group attached to a base molecule of varying structures.

Murayama et al U.S. Pat. No. 3,898,303 patented Aug. 5, 1975 propose piperidino-spiro-hydantoin derivatives having the formula:

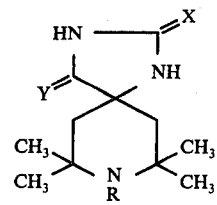

wherein

R represents an alkyl group, an alkenyl group, an alkenoyl group which may be substituted with an aryl group, a hydroxyalkyl group, an alkoxyalkyl group, an alkoxycarbonylalkyl group, an acyloxyalkyl group, a cyanoalkyl group or nitroso group, and X and Y individually represent oxygen atom or sulfur atom.

Murayama et al in U.S. Pat. No. 3,899,464 patented Aug. 12, 1975 disclose a variation of the piperidino spiro compounds having the formula:

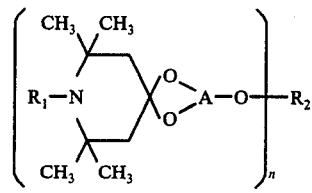

wherein $R_1$ represents hydrogen atom, an alkyl group, a substituted alkyl group, an alkenyl group, an alkynyl group, a substituted or unsubstituted aralkyl group, an aliphatic acyl group, an alkoxycarbonyl group or an aralkoxycarbonyl group, n is an integer of 1 to 4;

when $n$ is 1, $R_2$ represents hydrogen atom, an aliphatic, aromatic or heterocyclic monoacyl group, an alkyl grup, an alkenyl group, an alkynyl group, an aralkyl group, an aryl group, an alkoxyalkyl group, an epoxyalkyl group, an alkoxysulfonylalkyl group, N-substituted carbamoyl group, a N-substituted thiocarbamoyl group, a monovalent group from an oxoacid or group

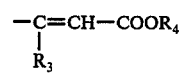

in which $R_3$ represents hydrogen atom, a lower alkyl group or phenyl group and $R_4$ represents an alkyl group;

when $n$ is 2, $R_2$ represents carbonyl group, an aliphatic or aromatic diacyl group, an alkylene group, an alkenylene group, an alkynylene group, an aralkylene group, a N-substituted dicarbamoyl group or a divalent group from an oxoacid;

when $n$ is 3, $R_2$ represents an aromatic triacyl group or a trivalent group from an oxoacid; and when $n$ is 4, $R_2$ represents an aromatic tetraacyl group, and A represents a group

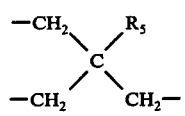

in which
R₅ represents hydrogen atom or a lower alkyl group or, when $n$ is 1, R₅ may represent together with R₂ a group

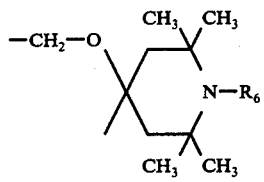

in which
R₆ represents the same group as defined in R₁ and may be the same or different from R₁, or a group

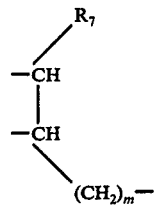

in which
$m$ is 1 or 2 and R₇ represents hydrogen atom or, when $n$ and $m$ are 1, R₇ represents methylene group together with R₂.

Murayama et al U.S. Pat. No. 3,933,735 patented Jan. 20, 1976 propose 4-piperidone derivatives having a structure similar to the 4-piperidyl derivatives, but with a keto oxygen at the 4-position of the piperidine ring.

Murayama et al U.S. Pat. No. 3,941,744 patented Mar. 2, 1976, disclose another variation of the piperidine spiro derivatives having the formula:

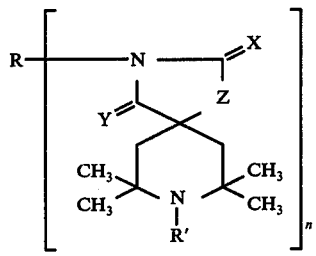

wherein
R' represents an alkyl group, a substituted alkyl group, an acyl group, an alkoxycarbonyl group, a substituted alkoxycarbonyl group, an amino group, a substituted amino group or nitroso group;
X represents oxygen atom or sulfur atom;
Y represents oxygen atom, sulfur atom or a group of the formula =N-R" in which R" is hydrogen atom, an alkyl group or a substituted alkyl group;
Z represents oxgyen atom or a group of the formula >N-R'" is hydrogen atom, an alkyl group or a substituted alkyl group;

$n$ is an integer of 1 through 4 inclusive; and
R represents, when $n$ is 1, an alkyl group, a substituted alkyl group, an aryl group, a substituted aryl group, a cycloalkyl group, an alkoxycarbonyl group, a substituted alkoxycarbonyl group, a substituted phosphino group or a substituted phosphinyl group, when $n$ is 2, an alkylene group, an alkenylene group, an arylene group, a substituted arylene group, an aralkylene group, an alkylenediphenylene group, a bis-(acyloxyalkylene) group, an alkylene-bis-(oxycarbonylalkyl) group, a dialkylene ether group or a diphenylene ether group, when $n$ is 3, an alkanetriyl group, a tris-(acyloxyalkylene) group, an alkane-tris-(oxycarbonylalkyl) group or a group of the group

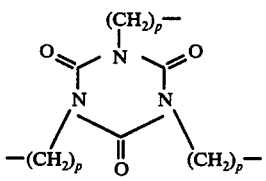

in which
$p$ is an integer of 1 through 8 inclusive, and when $n$ is 4, an alkane tetrayl group, a tetrakis-(acyloxyalkylene) group or an alkanetetrakis-(oxycarbonylalkyl) group.

Murayama et al U.S. Pat. No. 3,940,363 patented Feb. 24, 1976 disclose a further variation in which two 2,2,6,6-tetrasubstituted-4-piperidyl groups are linked together via the ring nitrogen atom to an R' alkylene linking group, which may be interrupted with an oxygen or sulfur atom, an alkenylene group, an alkynylene group, an aralkylene group, an aliphatic diacyl group, a group having the formula:

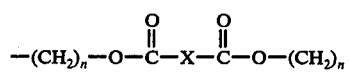

in which
$n$ is an integer of 1 or 2 and X is an alkylene group, or o-, m- or p-phenylene group or the carbon atoms of CO groups may be directly joined in the absence of X or a group of the formula:

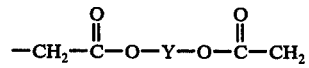

in which
Y is an alkylene group or o-, m- or p-phenylene group.

Ramey et al U.S. Pat. Nos. 3,899,491, patened Aug. 12, 1975 and 3,920,659, patented Nov. 18, 1975, disclose alkyl alkanoate derivatives of substituted piperazines and substituted piperazinodiones. The substituted piperazines of U.S. Pat. No. 3,899,491 have the formula:

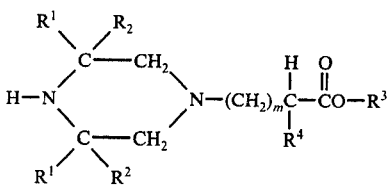

wherein
 R$^1$ and R$^2$ are methyl or together with the carbon to which they are bound form a mono-cyclic ring system having five or six carbon atoms;
 R$^3$ is an alkyl group of from one to twenty atoms;
 R$^4$ is hydrogen or methyl, and
 m is 0 or 1.

The substituted piperazinodiones of U.S. Pat. No. 3,920,659 have the formula:

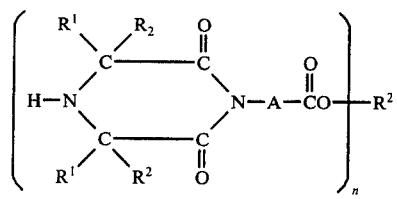

wherein
 R$^1$ and R$^2$ are independently of each other methyl or ethyl or together with the carbon to which they are bound form a cyclopentyl or cyclohexyl ring, which is unsubstituted or substituted with a methyl group;
 n is an integer of from 1 to 2;
 when n is 1, R$^3$ is an alkyl group of from one to 20 carbon atoms;
 when n is 2, R$^3$ is an alkylene group of from two to eight carbon atoms; and
 A is a straight or branched chain (lower) alkylene group containing from one to six carbon atoms with the limitation that the terminals of said alkylene group bear only hydrogen or one (lower) alkyl group.

Ramey et al U.S. Pat. No. 3,920,661 patented Nov. 18, 1975 disclose dicarboxylic acids and salts in which one carboxylic acid group is esterified with a 2,2,6,6-tetrasubstituted-4-hydroxy piperidine and having the formula:

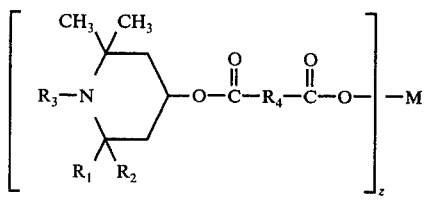

wherein
 R$_1$ and R$_2$ independently of each other are straight- or branched-chain alkyl having from one to six carbon atoms, or together with the carbon to which they are bound form a cyclopentyl or cyclohexyl ring, which is unsubstituted or substituted with a methyl group;
 R$_3$ is hydrogen, alkyl having one to twelve carbon atoms, β-methoxyethyl, alkenyl having three or four carbon atoms, propargyl, benzyl or alkyl-substituted benzyl;
 R$_4$ is straight or branched-chain alkylene having five to eight carbon atoms, or the group (CH$_2$)$_m$Y(CH$_2$)$_n$ wherein Y is oxygen or sulfur and m and n independently of each other are an integer from 1 to 3;
 M is hydrogen or a metal selected from the group consisting of barium, nickel, manganese, calcium, zinc, iron, sodium, cobalt, tin, and dialkyl tin, and dialkyl tin, and
 z has a value of from 1 to 4, the value of z being the same as the available valence of M.

Ramey et al U.S. Pat. No. 3,939,163 patented Feb. 17, 1976 disclose closely similar compunds in which R$_4$ is alkylene having from one to four carbon atoms.

Randell et al U.S. Pat. No. 3,939,170 patented Feb. 17, 1976 disclose dehydropyridinyl sulphides, sulphoxides and sulphones having the formula:

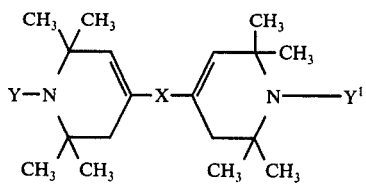

wherein
wherein
 X is S, SO or SO$_2$ and Y and Y$^1$ are the same or different and each is H, OH, O- or a straight- or branched alkyl residue having from one to four carbon atoms, and salts thereof when Y and Y' are other than O-.

Randell et al in published patent application Ser. No. B408,123 published Apr. 13, 1976 disclose substituted piperidine-4-ols having the formula:

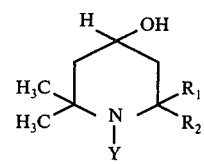

wherein
 R$_1$ and R$_2$ are the same or different and each is a straight- or branched alkyl residue having from one to twelve carbon atoms, or R$_1$ and R$_2$, together with the carbon atom to which they are attached, form a cycloalkyl residue having from five to twelve carbon atoms or the group:

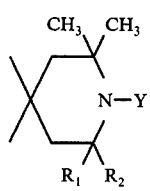

wherein
 R$_1$ and R$_2$ have their previous significance and Y is a straight- or branched alkyl residue having from one to twenty carbon atoms, an alkenyl or alkynyl residue having from three to twenty carbon atoms, an aralkyl residue having from 7 to 12 carbon atoms or the group —CH$_2$X wherein X is the group $$\text{CH}_2\text{—CH—} \underset{O}{\diagdown\diagup} \quad \text{or} \quad \text{—CH—OH} \underset{R_3}{|}$$

wherein

R$_3$ is hydrogen, a methyl or phenyl residue, the group $$\text{—C—R}_4 \underset{\|}{O} \quad \text{or} \quad \text{—COR}_4 \underset{\|}{O}$$

wherein

R$_4$ is an alkyl residue having from one to 20 carbon atoms.

Cook U.S. Pat. No. 3,929,804 patented Dec. 30, 1975 discloses 4-piperidine acetamide compounds having the formula:

$$\left[\begin{array}{c} R_3 \diagdown \diagup \text{CO—X} \\ \text{CH} \\ H_3C \diagdown \diagup R_1 \\ H_3C \diagup N \diagdown R_2 \\ H \end{array}\right]_n \quad \text{—R}_4 \quad I$$

wherein

R$_1$ and R$_2$ are the same or different and each is a straight- or branched alkyl residue having from one to twelve carbon atoms, or R$_1$ and R$_2$, together with the carbon atoms to which they are attached form a cycloalkyl group having from five to twelve carbon atoms;

R$_3$ is hydrogen, a straight- or branched alkyl residue having from one to four carbon atoms, an aralkyl residue having from seven to nine carbon atoms or a cycloalkyl group having from five or six carbon atoms;

R$_4$ is a metal ion or a hydrocarbyl residue having from two to 20 carbon atoms and being either unsubstituted or substituted by halogen or interrupted by one or more oxygen or sulphur atoms;

X is —O—, —S—, or >NR$_5$, wherein R$_5$ has the same significance as R$_3$; and n is 2, 3 or 4; as well as salts of the amine function of the compounds of formula I.

Cook U.S. Pat. No. 3,939,168 patented Feb. 17, 1976 discloses closely similar compounds having a Y substituent on the piperidyl nitrogen atom, Y bein alkyl, alkenyl, aralkyl or a group $$\text{R}_7\text{—CH—CH}_2\text{—} \underset{\text{OH}}{|}$$

wherein

R$_7$ is hydrogen, alkyl or phenyl.

In accordance with the instant invention, 2,2,6,6-tetramethyl-4-piperidyl esters of bicyclic heptane and octane carboxylic acids are provided having the formula:

$$\left[\begin{array}{c} CH_3 \diagdown \diagup CH_3 \\ R_1\text{—N} \diagup \diagdown \text{—O—C—} \\ \underset{\|}{O} \\ CH_3 \diagup \diagdown CH_3 \end{array}\right]_a \; \overset{\text{·--·}}{\underset{\cdot Z \cdot}{\cdots}} \; \left[\text{—C—O—R}_2 \underset{\|}{O}\right]_b \quad I$$

R$_1$ is selected from the group consisting of hydrogen and O;

R$_2$ is selected from the group consisting of alkyl; alkenyl; cycloalkyl; aryl; alkaryl; aralkyl;

a is selected from the group consisting of 1, 2, 3 and 4;

b is selected from the group consisting of 0, 1, 2 and 3; and a + b is 1, 2, 3 or 4; and Z is a bicyclic heptane or octane ring having from seven to eight ring carbon atoms.

The bicarbocyclic heptane and octane rings can carry from one to four substituents selected from the group consisting of halogen (chlorine, bromine, fluorine or iodine), alkyl, cycloalkyl and aryl.

When b = 0, the compounds take the form:

$$\left[\begin{array}{c} CH_3 \diagdown \diagup CH_3 \\ R_1\text{—N} \diagup \diagdown \text{—O—C—} \\ \underset{\|}{O} \\ CH_3 \diagup \diagdown CH_3 \end{array}\right]_a \; \overset{\text{·--·}}{\underset{\cdot Z \cdot}{\cdots}} \quad II$$

where the R$_1$, a, and Z are as defined in Formula I.

When b = 1, the compounds take the form:

$$\left[\begin{array}{c} CH_3 \diagdown \diagup CH_3 \\ R_1\text{—N} \diagup \diagdown \text{—O—C—} \\ \underset{\|}{O} \\ CH_3 \diagup \diagdown CH_3 \end{array}\right]_a \; \overset{\text{·--·}}{\underset{\cdot Z \cdot}{\cdots}} \; \text{—C—O—R}_2 \underset{\|}{O} \quad III$$

Other variations will be apparent, from consideration of Formula I.

The R$_2$ alkyl and bicarbocyclic heptane or octane ring alkyl substituents have from one to about six carbon atoms. Exemplary are methyl, ethyl, n-propyl, isopropyl, n-butyl, isobutyl, tertiary butyl, secondary butyl, n-amyl, isoamyl, tertiary amyl, n-hexyl, isohexyl, secondary hexyl and tertiary hexyl.

The R$_2$ alkenyl has from two to about six carbon atoms. Exemplary alkenyl include propenyl-1 and -2; butenyl-1, -2, -3 and -4; pentenyl-1, -2, -3, -4 and -5; and hexenyl-1, -2, -3, -4, -5 and -6.

The R$_2$ cycloalkyl and bicarbocyclic heptane or octane ring cycloalkyl substituent have from three to eight carbon atoms and include cyclopropyl, cyclobutyl, cyclopentyl, cyclohexyl, cycloheptyl, and cyclooctyl.

The R$_2$ and bicarbocyclic heptane or octane ring aryl substituent have from six to 14 carbon atoms and include phenyl, naphthyl and phenanthryl.

The $R_2$ aralkyl and alkaryl have from seven to about fourteen carbon atoms and include benzyl, tolyl, xylyl, ethylene phenyl, propylene phenyl, butylene phenyl, pentylene naphthyl, phenmethyl, phenethyl, phenpropyl, phenbutyl and naphthethyl.

The bicarbocyclic heptane and octane rings have from seven to eight carbon atoms, and can include from one to six alkyl, cycloalkyl and aryl substituents.

The following compounds are exemplary:

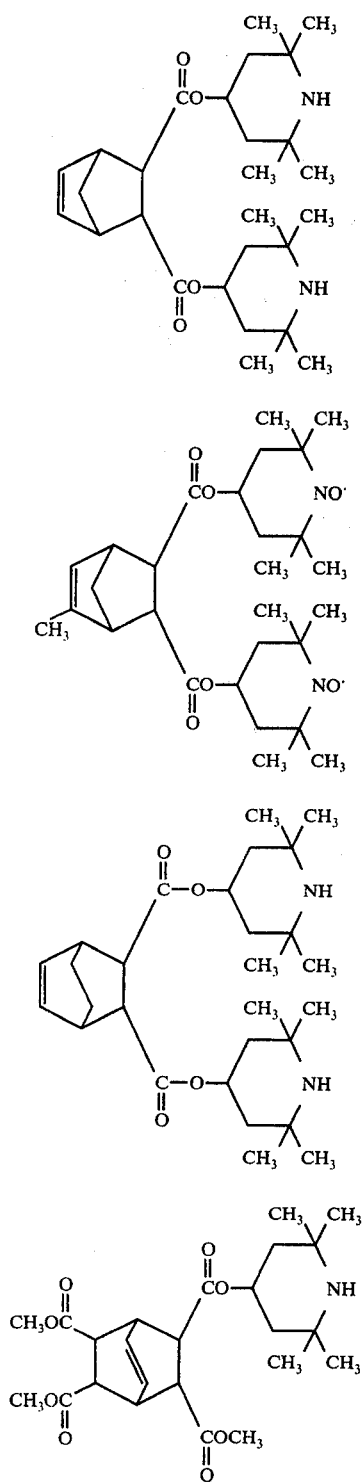

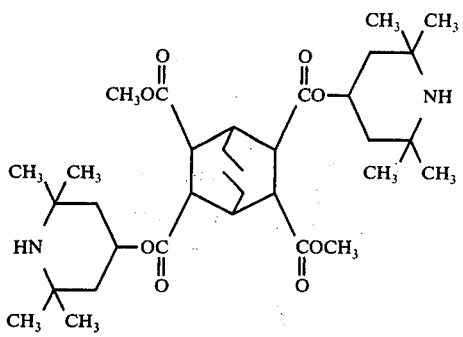

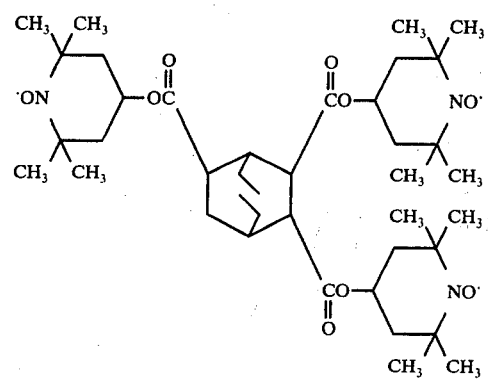

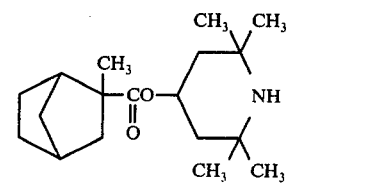

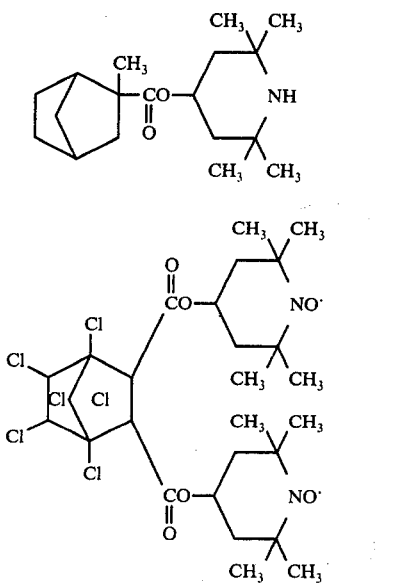

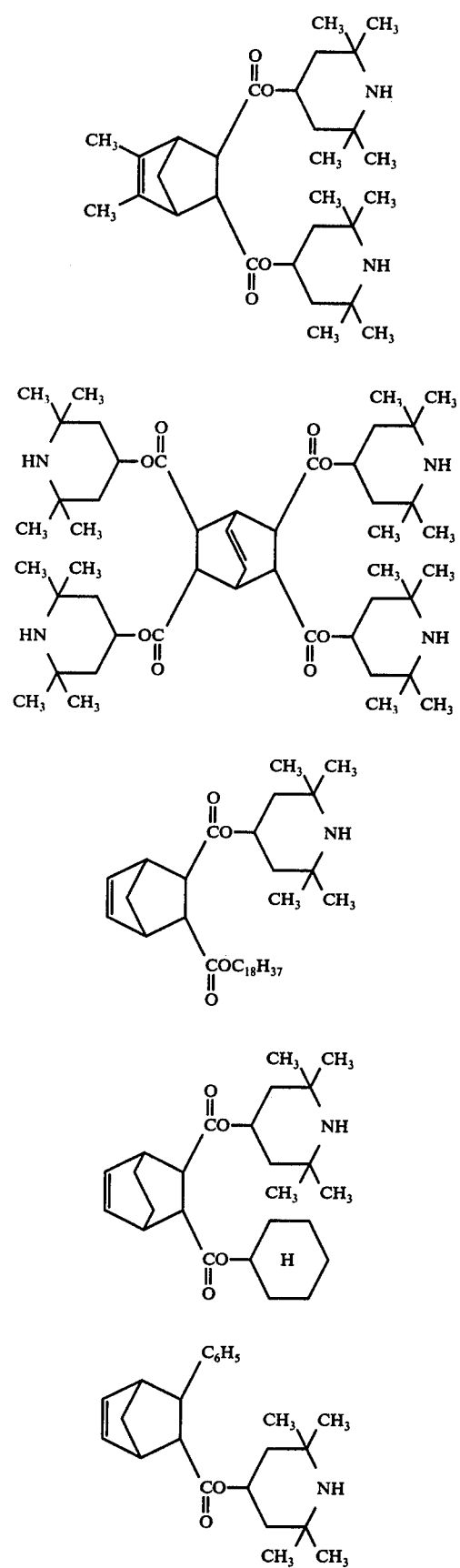
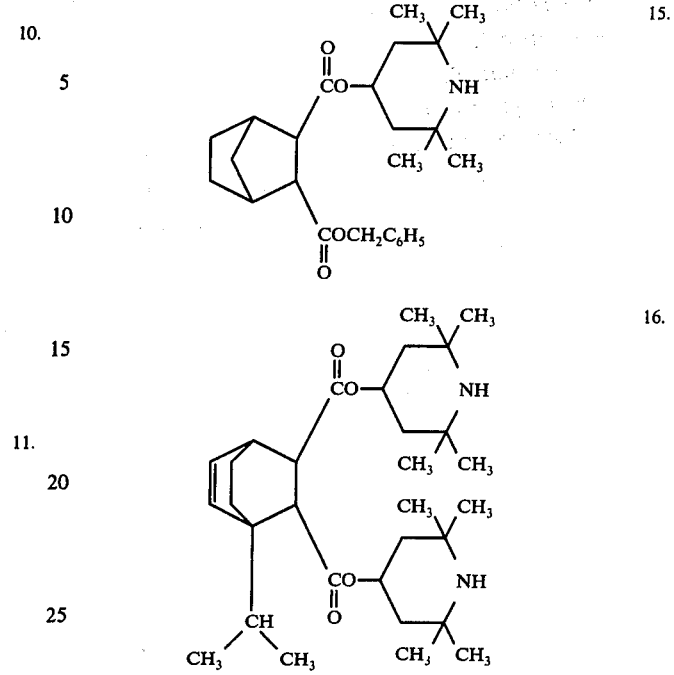

The compounds in accordance with the invention are readily prepared using conventional procedures. The starting materials are either available or readily synthesized without difficulty.

The bicyclic heptane and octane carboxylic acids of the invention are prepared by the Diels-Adler reaction, between a conjugated cyclic diene and an unsaturated carboxylic acid or acid anhydride having $a + b$ acid groups, which results in a bicyclic heptane or octane carboxylic acid or anhydride, having $a + b$ acid groups, followed by hydrogenation to the corresponding bicyclic heptane or octane carboxylic acid or anhydride having $a + b$ acid groups.

For example, 3,4,5,6,7,7-hexachlorobicyclo-4-heptane-1,2-dicarboxylic anhydride is obtained from hexachlorocyclopentadiene and maleic anhydride; the hydrogenation product of this is the bicyclic starting material for compound No. 8, above.

The reaction is adapted to the preparation of compounds with one to four and more carboxylic acid groups. For example, compound No. 7 above results from the reaction of methacrylic acid with cyclopentadiene, and subsequent hydrogenation and esterification to add the 2,2,6,6-tetramethyl piperidinyl group.

Compounds No. 4 and 11 above are obtained by the reaction of maleic anhydride with 3,5-cyclohexadiene-1,2-di-carboxylic anhydride, and compound No. 9 from maleic anhydride and methylisopropylcyclohexadiene, which is the natural terpene alpha-phellandrene. Reaction products from maleic anhydride and rosin acids can also be used. The acidity of maleic anhydride catalyzes the isomerization of abietic acid (and other rosin acids not having both double bonds in the same ring) to the conjugated isomer shown below, which then adds to maleic anhydride to give the bridged ring tricarboxylic acid compound:

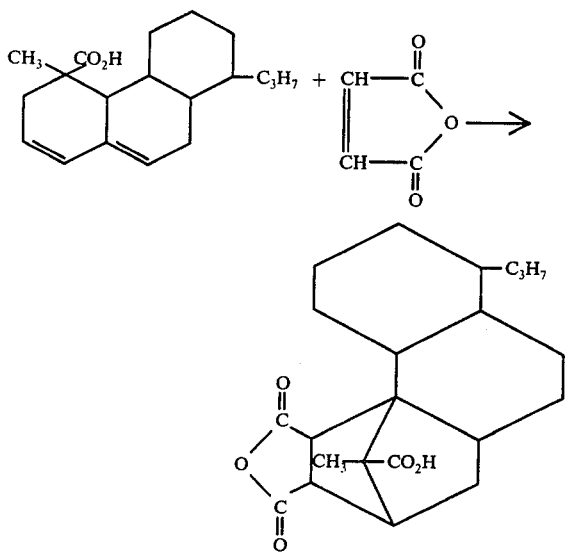

The corresponding 2,2,6,6-tetramethyl-4-hydroxy piperidine is used as a starting material for the 2,2,6,6-tetramethyl-4-piperidyl ester group. This is reacted in the presence of an organic solvent and an alkyl titanate with one or more carboxylic acid groups of the corresponding bicarbocyclic heptane or octane containing one or more carboxylic acid groups. The hydroxy group of the piperidine becomes esterified with the carboxylic acid group of the ring compound forming the 4-piperidinyl bicarbocyclic heptane or octane carboxylic acid ester of the invention:

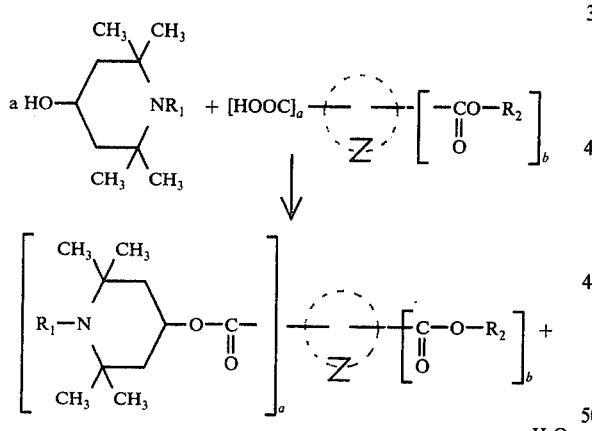

EXAMPLE I

Preparation of

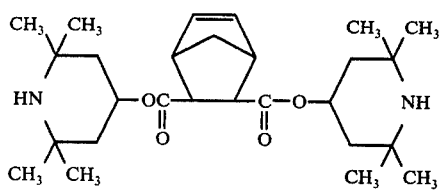

Bicycloheptane-2,3-di-carboxylic acid 18 g, 35 g of 2,2,6,6-tetramethyl-4-hydroxy piperidine, 80 ml of xylene and 1 ml of tetraisopropyl titanate was blended and stirred for eight hours under reflux removing 3.6 ml of by-produced water. The reaction mixture was cooled, 150 ml of ether was added and the resulting solution washed with water, dried, and the solvent removed by distillation.

A viscous liquid was obtained, which was washed with hexane, after which a white powder was recovered. The powder had the following analysis:

|  | C | H | N |
|---|---|---|---|
| Found | 71.03 | 9.61 | 6.07 |
| Calculated for formula above | 70.38 | 9.63 | 6.11 |

This demonstrated that the compound had the formula shown above.

EXAMPLE II

Preparation of

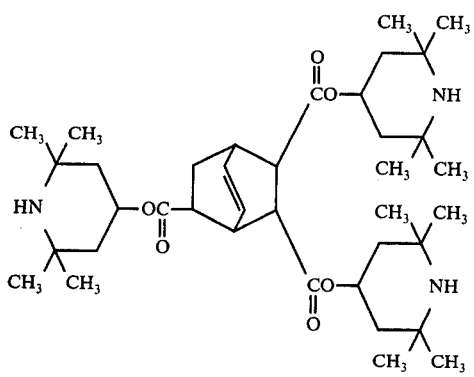

Bicyclooctane-2,5,6-tricarboxylic acid, 12 g; 2,2,6,6,4-hydroxy piperidine, 27 g, 100 ml of xylene and 1 ml of tetra isopropyl titanate was blended and stirred for ten hours under reflux removing 2.7 ml of by-product water. After cooling, 200 ml of ether was added, and the resulting solution was washed with water, dried, and the solvent removed by distillation. A viscous liquid was obtained. This was washed with hexane, whereupon 28 g of a white powder was obtained.

This powder had the following analysis:

|  | C | H | N |
|---|---|---|---|
| Found | 69.88 | 9.57 | 6.40 |
| Calculated for formula above | 69.34 | 9.65 | 6.41 |

This demonstrated that the compound had the formula shown above.

The 2,2,6,6-tetramethyl-4-piperidyl bicarbocyclic heptane and octane carboxylic acid esters of the invention are effective stabilizers to enhance the resistance to deterioration due to heat and/or light of synthetic polymeric materials which are susceptible to such degradation, including polyolefins such as low density polyethylene, high density polyethylene, polypropylene, polybutylene, polyisobutylene, polypentylene, and polyisopentylene, polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrile-styrene-butadiene copolymers, synthetic rubbers of all types, such as polychloroprene; polyvinyl halides, including polyvinyl chloride homopolymer, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsiloncaprolactam; polyhexamethylene adipamide and polydecamethylene adipamide; polyurethanes; and epoxy resins.

The synthetic polymer can be in any physical form, including (for example) filaments, yarns, films, sheet, molded articles, latex, and foam.

The stabilizers of the invention can be employed as the sole stabilizer or, preferably, in combination with other conventional heat and light stabilizers for the particular synthetic polymer.

Thus, for example, in the case of polyvinyl chloride resins, other polyvinyl chloride resin heat statilizers can be included, including polyvalent metal fatty acid salts such as barium and cadmium salts of the higher fatty acids; organic triphosphites; organotin compounds; hindered phenols; and epoxy compounds.

With polyolefin resins there can be employed fatty acid salts of polyvalent metals, organic phosphites, phenolic antioxidants, and the higher fatty acid esters of thiodipropionic acids, such as, for example, dilauryl thiodipropionate.

With polyamide resin compositions, polyamide stabilizers such as copper salts in combination with iodides and/or phosphorus compounds and salts of divalent manganese can be used.

With synthetic rubbers and acrylonitrile butadiene-styrene-terpolymers, antioxidants such as hindered phenols and bis-phenols, polyvalent metal salts of the higher fatty acids, and organic phosphites can be used.

In addition, other conventional additives for synthetic polymers, such as plasticizers, lubricants, emulsifiers, antistatic agents, flameproofing agents, pigments and fillers, can be employed.

The following Examples in the opinion of the inventors represent preferred embodiments of synthetic resin compositions in accordance with the invention:

EXAMPLES 1 to 5

A group of polyvinyl chloride resin compositions were prepared having the following formulation:

| Ingredient | Parts by Weight |
| --- | --- |
| Polyvinyl chloride | 100 |
| Dioctylphthalate | 50 |
| Ca stearate | 1.0 |
| Zn stearate | 0.1 |
| Stabilizer as shown in Table I | 0.1 |

This formulation was blended and sheeted off on a two-roll mill to form sheets 1 mm thick. The light resistance of these sheets was then determined by placing strips 1 cm long in a Weather-O-Meter, and exposing them to ultraviolet light. The time in hours was then noted for the sheet to develop a noticeable discoloration and/or embrittlement, indicating deterioration due to oxidation in the presence of ultraviolet light.

This test was repeated for a total of five stabilizers in accordance with the invention, having the formulae indicated in Table I and one of the prior art. The following results were obtained:

TABLE I

| Ex. No. | Stabilizer | Hours to Failure |
| --- | --- | --- |
| Control | 2-hydroxy-4-octoxybenzophenone | 360 |
| 1 | [structure] | 620 |
| 2 | [structure] | 620 |

TABLE I-continued

| Ex. No. | Stabilizer | Hours to Failure |
|---|---|---|
| 3 | 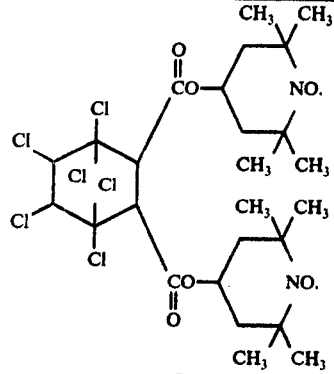 | 670 |
| 4 | 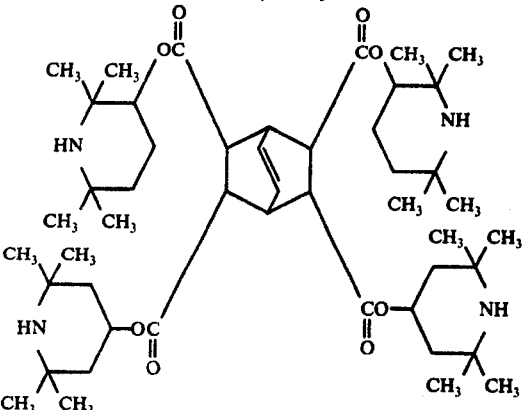 | 650 |
| 5 | 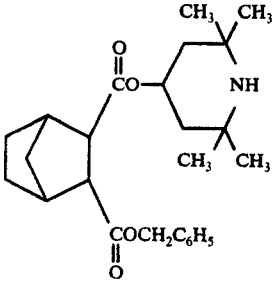 | 580 |

It is apparent that each of the stabilizers in accordance with the invention is far superior to the control, a conventional ultraviolet light stabilizer for polyvinyl chloride, 2-hydroxy-4-octoxy-benzophenone.

EXAMPLES 6 to 10

Polypropylene compositions were prepared using five stabilizers of the invention and one of the prior art, having the following formulation:

| Ingredient | Parts by Weight |
|---|---|
| Polypropylene | 100 |
| Distearylthiodipropionate | 0.3 |
| Goodrite 3114 (1,3,5,-tris-(3', 5'-di-t-butyl 4'-hydroxybenzyl) isocyanurate) | 0.1 |
| Stabilizer as shown in Table II | 0.3 |

The composition was thoroughly blended in a Brabender Plastograph, and then compression-molded to form sheets 0.5 mm thick. Pieces 2.5 cm square were cut off from the sheets and exposed to ultraviolet light in a Weather-O-Meter. The time in hours required for the sheet to develop a noticeable discoloration and/or embrittlement was noted as the hours to failure. The results obtained are shown in Table II.

TABLE II

| Example No. | Stabilizer | Hours to Failure |
|---|---|---|
| Control | 2,2,6,6-tetramethyl piperidinyl-4-benzoate | 220 |
| 6 | 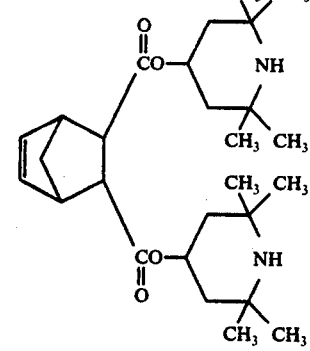 | 410 |

TABLE II-continued

| Example No. | Stabilizer | Hours to Failure |
|---|---|---|
| 7 | [norbornene dicarboxylate bis(2,2,6,6-tetramethylpiperidinyl) ester] | 480 |
| 8 | [hexachloronorbornane dicarboxylate bis(2,2,6,6-tetramethyl-N-oxyl-piperidinyl) ester] | 400 |
| 9 | [phenyl-norbornene carboxylate (2,2,6,6-tetramethylpiperidinyl) ester] | 410 |
| 10 | [isopropyl-norbornene dicarboxylate bis(2,2,6,6-tetramethylpiperidinyl) ester] | 430 |

It is apparent from the above results that the compounds of the invention are superior stabilizers in enhancing the resistance of the polypropylene polymer composition to deterioration in the presence of ultraviolet light.

EXAMPLES 11 to 15

Ethylene-vinyl acetate copolymer compositions were prepared using five stabilizers of the invention and one of the prior art, and having the following formulation:

| Ingredient | Parts by Weight |
|---|---|
| Ethylene-vinylacetate copolymer | 100 |
| Stabilizer as shown in Table III | 0.2 |

The stabilizer was blended with the polymer on a two-roll mill at 120° C, and sheets 1 mm thick were then compression molded at 120° C from the resulting blend. Pieces 2.5 cm square were cut off from the sheets and exposed to ultraviolet light in a Weather-O-Meter for 500 hours. At the start and at the conclusion of the test, the tensile strength of the sheet samples was determined. The results are given in Table III as % retention of the initially determined tensile strength:

TABLE III

| Example No. | Stabilizer | % Retention of Tensile Strength After 500 hours |
|---|---|---|
| Control | 2(2'-hydroxy-5'-methylphenyl)benzotriazole | 74 |
| 11 | [norbornene tetracarboxylate: methyl ester, methyl ester, bis(2,2,6,6-tetramethylpiperidinyl) ester] | 79 |
| 12 | [methyl-norbornane carboxylate (2,2,6,6-tetramethylpiperidinyl) ester] | 83 |

TABLE III-continued

| Example No. | Stabilizer | % Retention of Tensile Strength After 500 hours |
|---|---|---|
| 13 | [structure: norbornene with two ester substituents; one ester to 2,2,6,6-tetramethyl-4-piperidinyl (NH), other ester to cyclohexyl] | 80 |
| 14 | [structure: norbornene substituted with C$_6$H$_5$ and a —CO—O— ester to 2,2,6,6-tetramethyl-4-piperidinyl (NH)] | 85 |
| 15 | [structure: norbornane substituted with —CO—O— ester to 2,2,6,6-tetramethyl-4-piperidinyl (NH) and —COCH$_2$C$_6$H$_5$] | 80 |

It is apparent from the results that the stabilizer compositions in accordance with the invention are superior to 2-(2'-hydroxy-5'-methylphenyl) benzotriazole in enhancing the resistance of the ethylene-vinyl acetate copolymer to deterioration in the presence of ultraviolet light.

EXAMPLES 16 to 19

High density polyethylene compositions were prepared using four stabilizers of the invention and one of the prior art, and having the following formulation:

| Ingredient | Parts by Weight |
|---|---|
| High-density polyethylene | 100 |
| Stabilizer as shown in Table IV | 0.1 |

The stabilizer was blended with the polymer on a two-roll mill and sheets 0.5 mm thick were prepared by compression molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure and the results are reported in Table IV:

TABLE IV

| Example No. | Stabilizer | Hours to Failure |
|---|---|---|
| Control | bis(2,2,6,6-tetramethyl-4-piperidinyl)sebacate | 640 |

TABLE IV-continued

| Example No. | Stabilizer | Hours to Failure |
|---|---|---|
| 16 | [structure] | 1060 |
| 17 | [structure] | 1100 |
| 18 | [structure] | 1360 |
| 19 | [structure] | 1080 |

The stabilizers of the invention are clearly superior to the control in enhancing resistance of the polyethylene to degradation under ultraviolet light.

EXAMPLES 20 to 22

Acrylonitrile-butadiene-sytrene terpolymer resin compositions were prepared using three stabilizers of the invention and one of the prior art, and having the following formulation:

| Ingredient | Parts by Weight |
|---|---|
| Acrylonitrile-butadiene-styrene terpolymer | 100 |
| Stabilizer as shown in Table V | 0.1 |

The stabilizer was blended with the resin on a two-roll mill, and sheets 3 mm thick were prepared by compression molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tenstile strength retained, at the end of this time, in Table V.

| Ingredient | Parts by Weight |
|---|---|
| Poly-epsilon-caprolactam | 100 |
| Stabilizer as shown in Table VI | 0.1 |

TABLE V

| Example No. | Stabilizer | % Tensile Strength Retained |
|---|---|---|
| Control | 2,2'-dihydroxy-4-methoxybenzophenone | 70 |
| 20 | [structure] | 90 |
| 21 | [structure] | 87 |
| 22 | [structure] | 91 |

It is apparent from the data that the stabilizers of the invention are superior to the 2,2'-dihydroxy-4-methoxybenzophenone of the prior art.

EXAMPLES 23 to 25

Polyamide resin compositions were prepared using three stabilizers of the invention and having the following formulation:

The stabilizer was blended with the finely powdered poly-epsiloncaprolactam in a ball mill for fifteen minutes, and the resulting powder was then compession-molded at 250° C to form sheets 0.5 mm thick. Pieces 2.5 cm square were cut out from the sheets, and exposed to ultraviolet light in a Weather-O-Meter for 120 hours. At the conclusion of the test period, the color of the sheets was noted. The results are given in Table VI.

TABLE VI

| Example No. | Stablilzer | Color of Sheet |
|---|---|---|
| Control | None | Yellow |

TABLE VI-continued

| Example No. | Stablilzer | Color of Sheet |
|---|---|---|
| 23 | 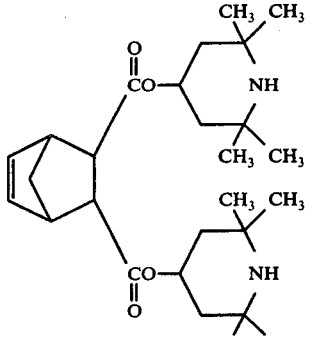 | Colorless |
| 24 | 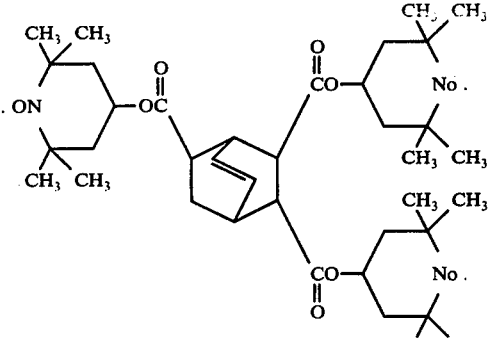 | Colorless |
| 25 | 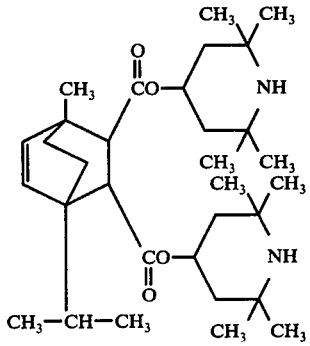 | Colorless |

It is apparent that the stabilizers of the invention are effective ultraviolet light stabilizers for polyamide resins.

Having regard to the foregoing disclosures, the following is claimed as the inventive and patentable embodiments thereof:

1. A 2,2,6,6-tetramethyl-4-piperidyl ester of bicyclic heptane and octane carboxylic acids useful as a stabilizer for organic polymeric materials, and having the general formula:

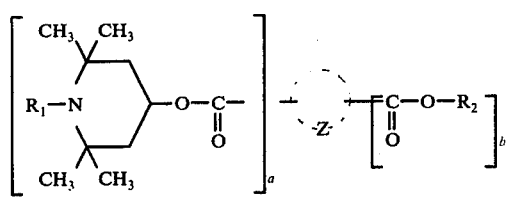

wherein:

$R_1$ is selected from the group consisting of hydrogen and O, $R_2$ is selected from the group consisting of alkyl; alkenyl; cycloalkyl; aryl; alkaryl; aralkyl;

$a$ is selected from the group consisting of 1, 2, 3 and 4;

$b$ is selected from the group consisting of 0, 1, 2 and 3; and $a + b$ is 1, 2, 3 or 4; and Z is a bicyclic heptane or octane ring having from seven to eight ring carbon atoms, and having from zero to four substituents selected from the group consisting of halogen, alkyl, cycloalkyl and aryl; the alkyl having from one to about six carbon atoms; the cycloalkyl having from three to about eight carbon atoms, and the aryl having from six to fourteen carbon atoms.

2. A compound according to claim 1 in which $a$ is 2 and $b$ is zero.

3. A compound according to claim 1 in which $a$ is 2 and $b$ is 2.

4. A compound according to claim 1 in which *a* is 1 and *b* is 1.

5. A compound according to claim 1 in which *a* is 3 and *b* is zero.

6. A compound according to claim 1 in which *a* is 1 and *b* is 3.

7. A compound according to claim 1 in which *a* is 4 and *b* is zero.

8. A compound according to claim 1 in which $R_1$ is hydrogen.

9. A compound according to claim 1 in which $R_1$ is O.

10. A compound according to claim 1 in which the bicyclic ring is alkyl-substituted, the alkyl having from one to six carbon atoms.

11. A compound according to claim 1 in which the bicyclic ring is aryl-substituted, the aryl having from six to fourteen carbon atoms.

12. A compound according to claim 1 in which Z is a bicarbocyclic heptane ring.

13. A compound according to claim 1 in which Z is a bicarbocyclic octane ring.

14. A compound according to claim 1 having the formula:

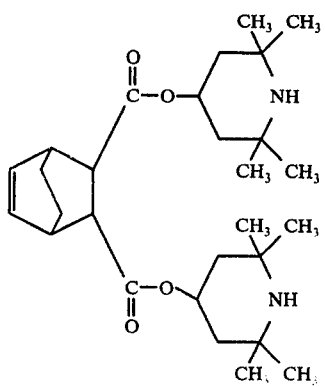

15. A compound according to claim 1 having the formula:

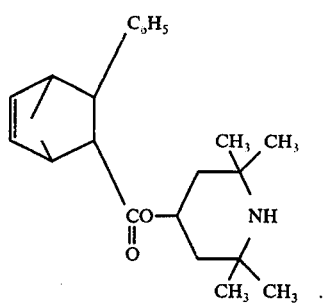

16. A compound according to claim 1 having the formula:

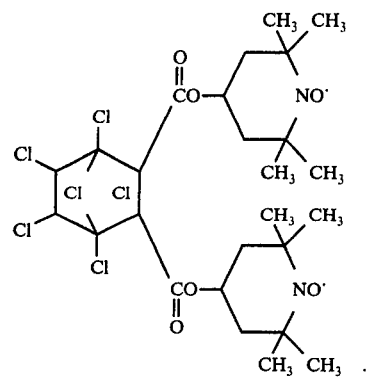

17. A compound according to claim 1 having the formula:

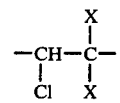

18. A polyvinyl chloride resin composition having improved resistance to deterioration when heated at 350° F, comprising a polyvinyl chloride resin formed at least in part of the recurring group

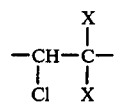

and having a chlorine content in excess of 40%, where X is either hydrogen or chlorine; and an amount to improve resistance to deterioration of the resin of a compound in accordance with claim 1.

19. A polyvinyl chloride resin composition in accordance with claim 18, in which the polyvinyl chloride resin is polyvinyl chloride homopolymer.

20. A polyvinyl chloride resin composition in accordance with claim 18 in which the polyvinyl chloride resin is a copolymer of vinyl chloride and vinyl acetate.

21. An olefin polymer composition having improved resistance to deterioration comprising an olefin polymer selected from the group consisting of polymers of alpha-olefins having from two to six carbon atoms and polystyrene, and an amount to improve resistance to deterioration of the resin of a compound in accordance with claim 1.

22. An olefin polymer composition in accordance with claim 21 wherein the polyolefin is polypropylene.

23. An olefin polymer composition in accordance with claim 21 wherein the polyolefin is polypropylene.

24. An acrylonitrile-butadiene-styrene polymer having improved resistance to deterioration when heated at 300° F and an amount to improve resistance to deterioration of the resin of a compound in accordance with claim 1.

25. A polyamide resin composition having improved resistance to deterioration comprising a polyamide resin having recurring amide groups as integral parts of the main polymer chain and an amount to improve resistance of the resin to deterioration of a compound in accordance with claim 1.

26. An ethylene-vinyl acetate copolymer composition having improved resistance to deterioration comprising an ethylene-vinyl acetate copolymer and an amount to improve resistance to deterioration of the resin of a compound in accordance with claim 1.

* * * * *

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

[57] Formula I : "

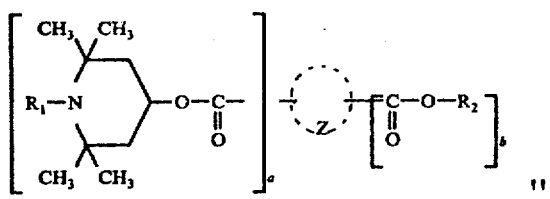

should be

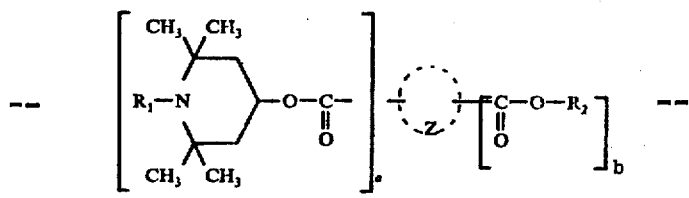

| | | |
|---|---|---|
| [57] | : | "O;" should be -- O˙; -- |
| Column 1, line 26 | : | "Formula" should be --formula-- |
| Column 2, line 44 | : | "grup" should be --group-- |
| Column 3, line 66 | : | "oxgyen" should be --oxygen-- |
| Column 4, line 63 | : | "patened" should be --patented-- |
| Column 6, line 11 | : | Delete "dialkyl tin and", second occurrence. |
| line 15 | : | "compunds" should be --compounds-- |

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 6, line 29 : Delete "wherein", first occurrence.

Column 7, line 56 : "bein" should be --being--

Column 8, Formula I: "
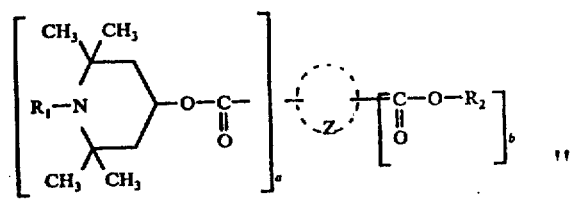
"

should be

--
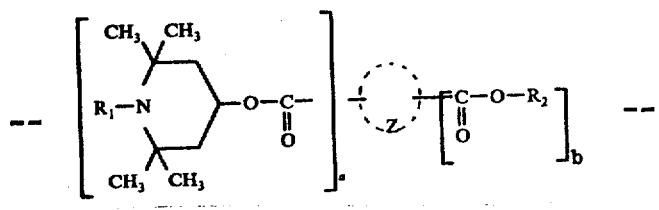
-- line 12 : "O;" should be -- O˙ ; -- line 66 : "bicarbocylic" should be --bicarbocyclic--

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 10, line 10 : "
 (Formula No. 5)

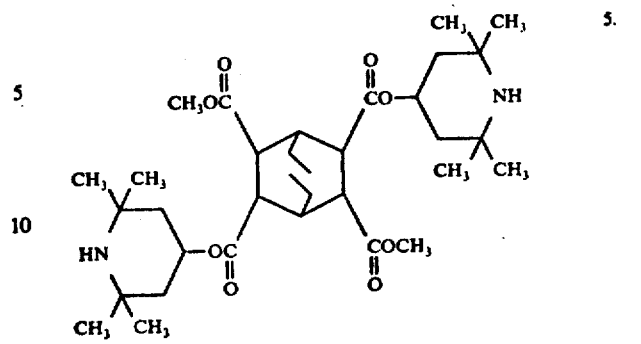

should be

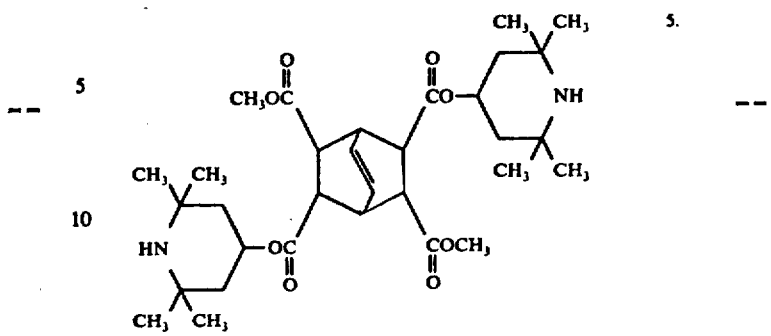

"

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 10, line 25 : " 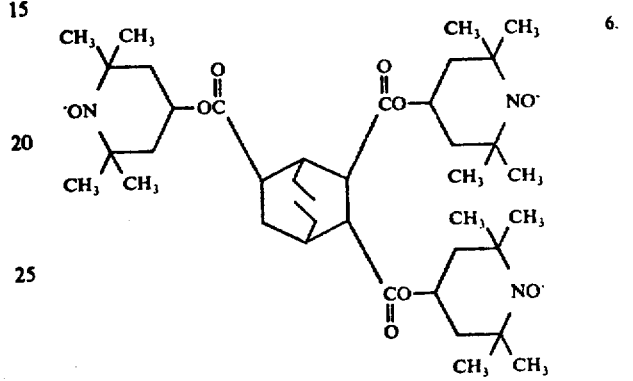 "
(Formula No. 6)

should be

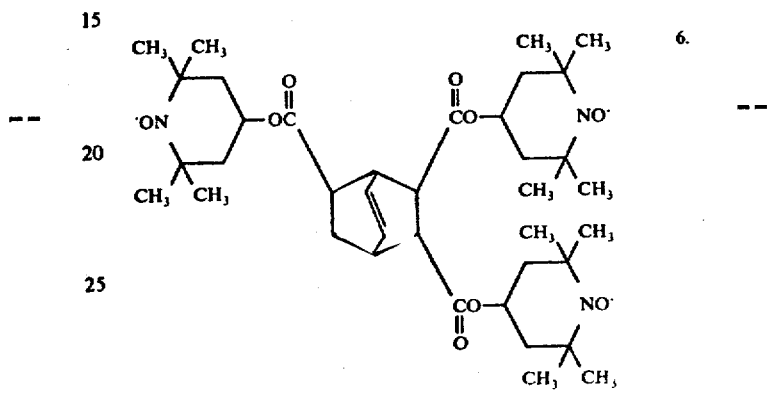

Column 15, line 20, "statilizers" should read -- stablilzers --
Column 16, line 1, "acrylonitrile butadiene-" should read
-- acrylonitrile-butadiene- --.

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al Page 5 of 16

It is certified that error appears in the above-identified patent and that said Letters Patent are hereby corrected as shown below:

Column 16, Table I : " '
No. 1

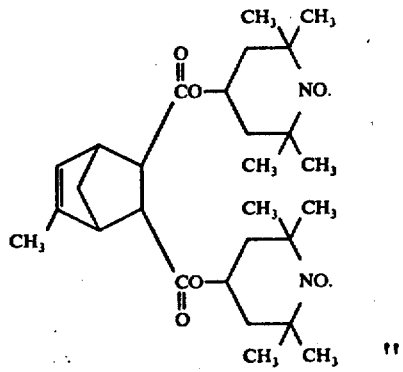

"

should be

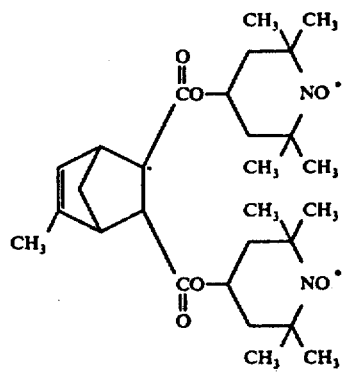

"

UNITED STATES PATENT AND TRADEMARK OFFICE
CERTIFICATE OF CORRECTION

PATENT NO. : 4,101,508

DATED : July 18, 1978

INVENTOR(S) : Motonobu Minagawa et al

Page 6 of 16

It is certified that error appears in the above-identified patent and that said Letters Patent are hereby corrected as shown below:

Column 16, Table I :
No. 2

"2

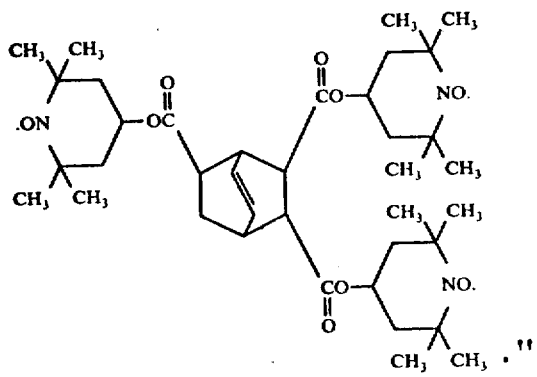

"

should be

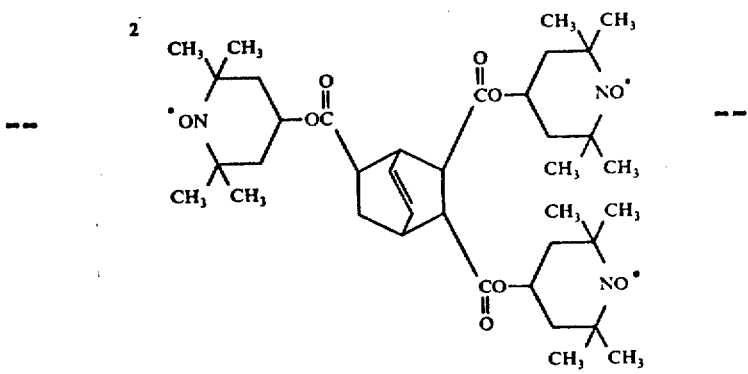

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 17, Table I :   " 3
   No. 3

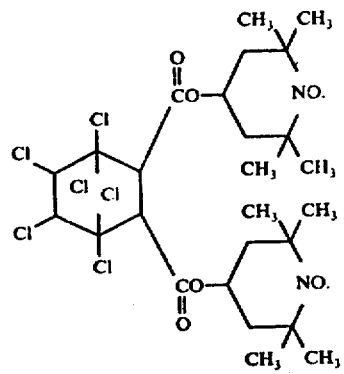
"

should be

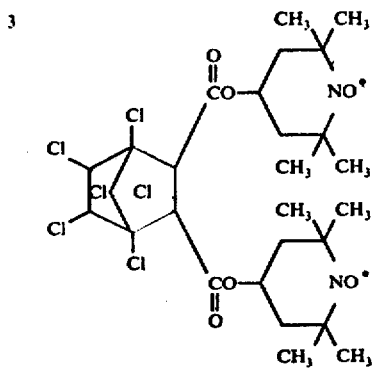

--   --

UNITED STATES PATENT AND TRADEMARK OFFICE
CERTIFICATE OF CORRECTION

PATENT NO. : 4,101,508

DATED : July 18, 1978

INVENTOR(S) : Motonobu Minagawa et al

Page 8 of 16

It is certified that error appears in the above-identified patent and that said Letters Patent are hereby corrected as shown below:

Column 19 Table II : " 8

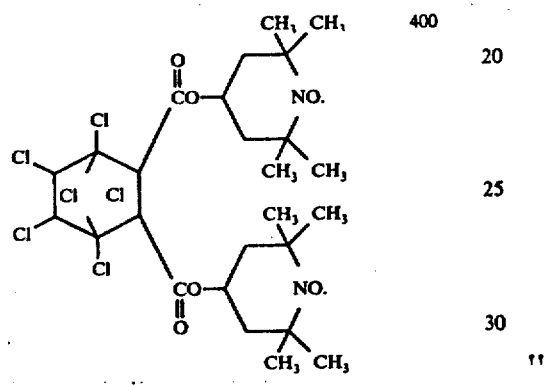

should be

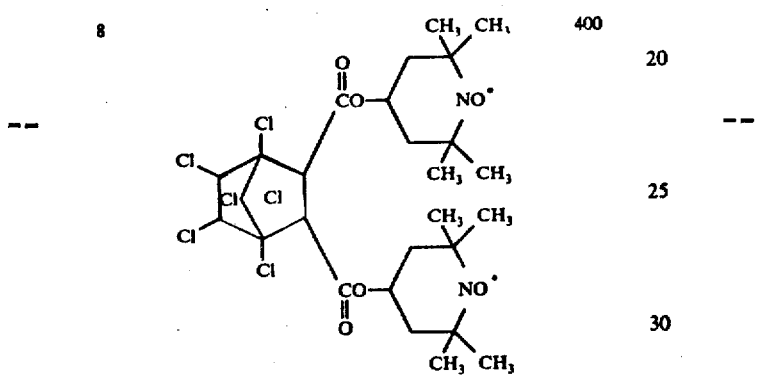

"

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 19, Table II
No. 9

" 9 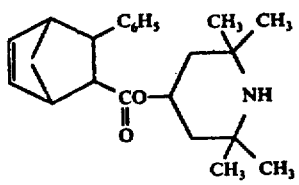 should be

9 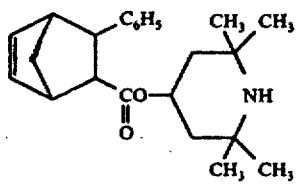 --

Column 21, Table III
No. 14

" 14 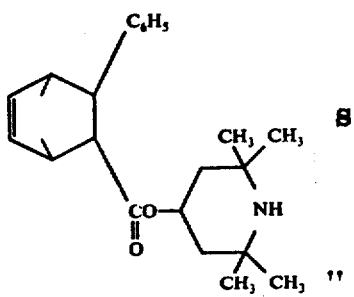 should be

14 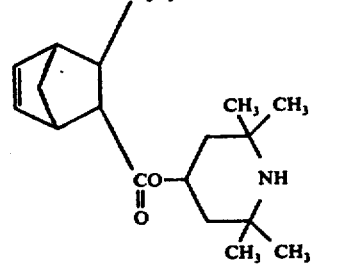 --

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 23, Table IV : " 16
  No. 16

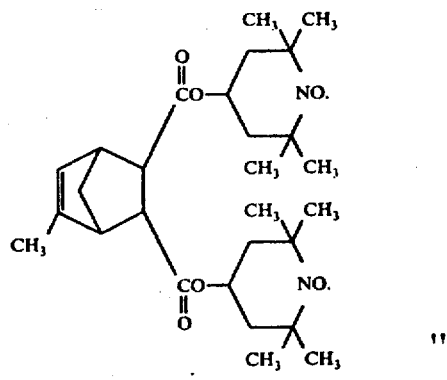

should be

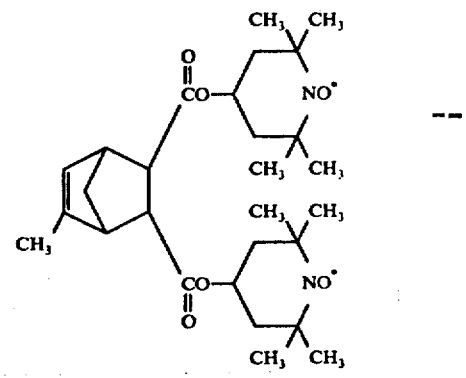

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 23, Table IV : " 17
No. 17

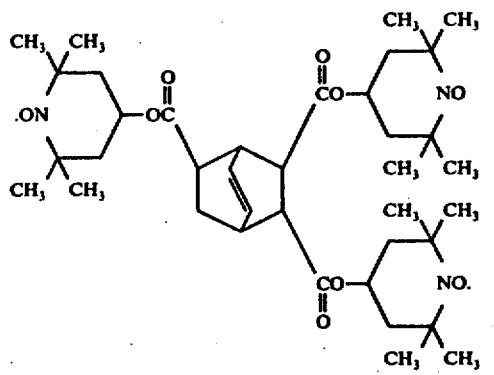

"

should be

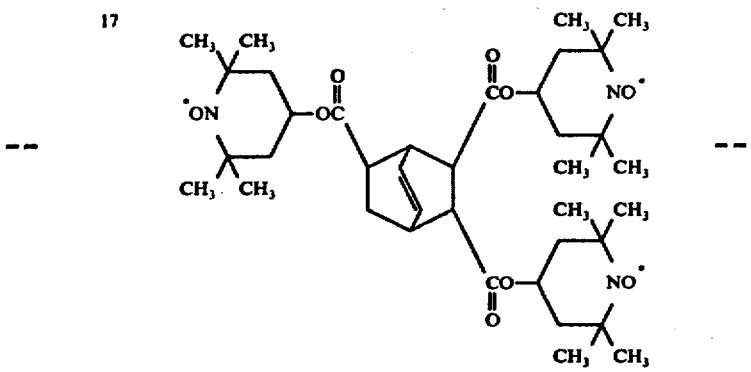

"

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 23, Table IV : " 18
   No. 18

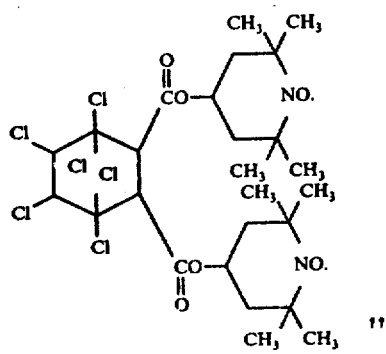

"

should be

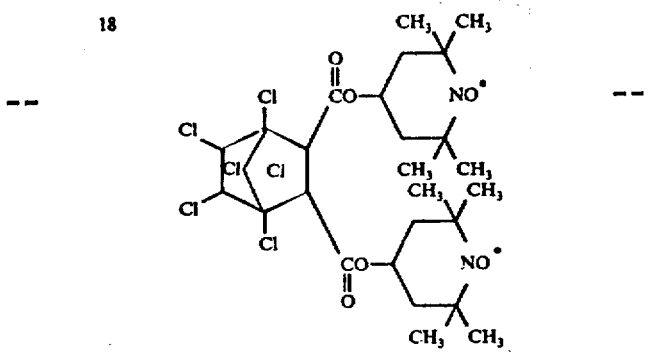

--

Column 23, line 65 : "sytrene" should be --styrene--

UNITED STATES PATENT AND TRADEMARK OFFICE
CERTIFICATE OF CORRECTION

PATENT NO. : 4,101,508
DATED : July 18, 1979
INVENTOR(S) : Motonobu Minagawa et al It is certified that error appears in the above-identified patent and that said Letters Patent are hereby corrected as shown below:

Column 25, Table V :   " 20
   No. 20

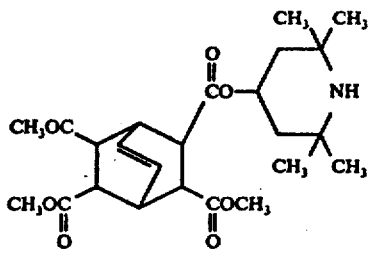   should be

"

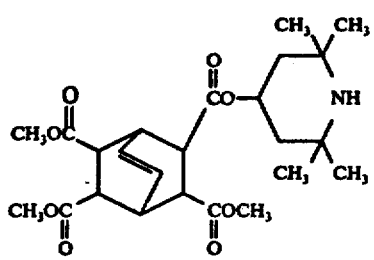   --

Column 26, line 55 :   "compession-" should be --compression-   --

Column 27, Table VI:
   No. 24

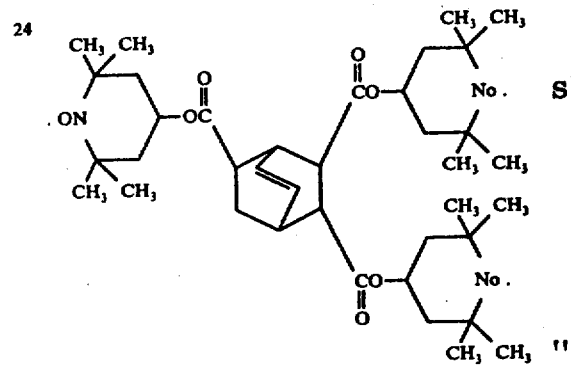   should be   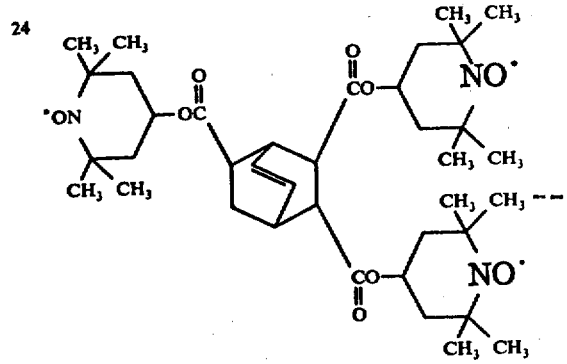

"

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 27, line 65 : "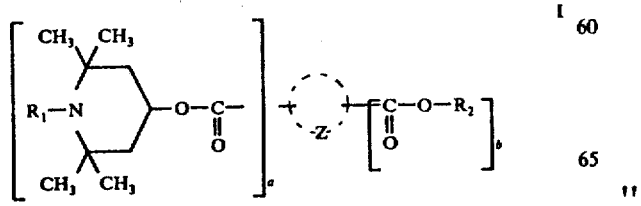

should be

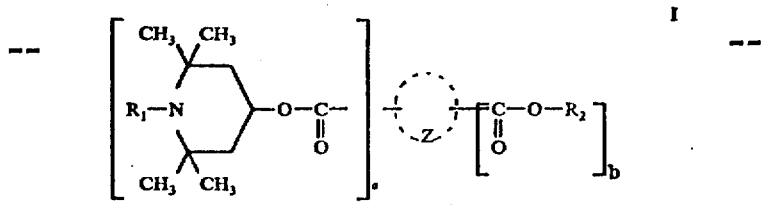 "

Column 28, line 49 : "O," should be --O⁻ ; -- line 57 : "Z" should be -- (Z) --

Column 29, line 25 : "Z" should be -- (Z) --

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 29, line 60 : " 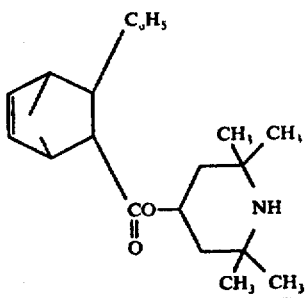 should be

-- 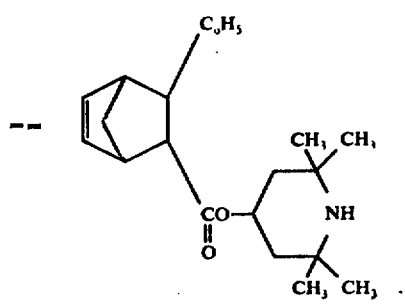 --

Column 30, line 52 (Claim 23) : "polypropylene" should be --polyethylene--

UNITED STATES PATENT AND TRADEMARK OFFICE
CERTIFICATE OF CORRECTION

PATENT NO. : 4,101,508
DATED : July 18, 1978
INVENTOR(S) : Motonobu Minagawa et al It is certified that error appears in the above-identified patent and that said Letters Patent are hereby corrected as shown below:

Column 30, line 5 :

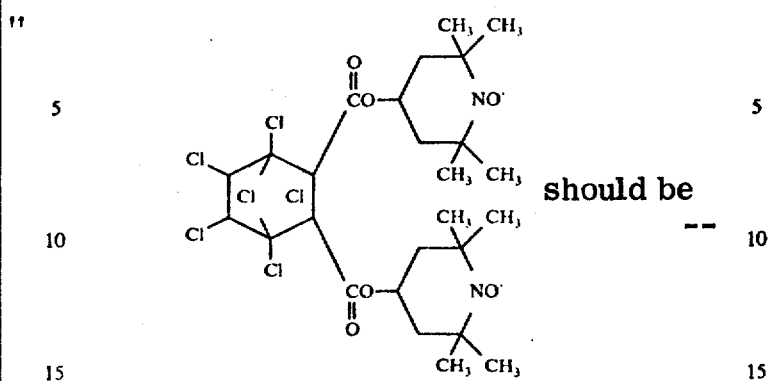 should be 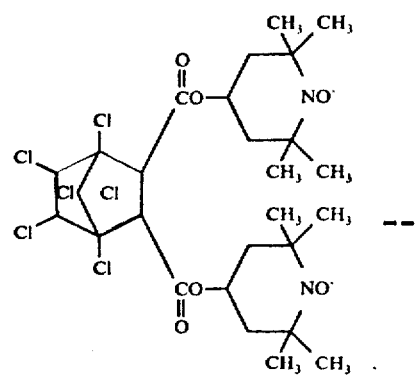

Signed and Sealed this

Fifth Day of February 1980

[SEAL]

Attest:

Attesting Officer

SIDNEY A. DIAMOND

Commissioner of Patents and Trademarks